Dec. 8, 1936.    R. F. BRADY    2,063,867
OPTICAL REDUCTION SOUND PRINTER
Filed Feb. 28, 1934

INVENTOR
RAYMOND F. BRADY
BY
ATTORNEY

Patented Dec. 8, 1936

2,063,867

UNITED STATES PATENT OFFICE 2,063,867

OPTICAL REDUCTION SOUND PRINTER

Raymond F. Brady, Collingswood, N. J., assignor to Radio Corporation of America, a corporation of Delaware Application February 28, 1934, Serial No. 713,262

2 Claims. (Cl. 88—24)

This invention pertains to projection printing apparatus, and more particularly to the variety thereof used in the projection of optically reduced prints of photographic soundtrack.

It is sometimes desirable to produce optically reduced prints from soundtracks particularly in the preparation of 16 mm. sound and picture film from 35 mm. sound and picture film. Such reduced prints are preferably prepared by the continuous projection printing of the soundtrack and the separate step printing of the pictures, and my invention pertains specifically to an improved optical system for use in this reduction printing of the soundtrack.

In 35 mm. film, the soundtrack locations vary somewhat according to the shrinkage, the type of recording of the soundtrack and the inaccuracies in the recording mechanism, and these errors are usually compensated for or allowed for in sound reproducers for use in 35 mm. film. In 16 mm. film, however, the soundtrack frequently occupies the space adjacent one edge from which sprocket holes have been omitted and greater precision in the location of the soundtrack in relation to the edge of the film is necessary.

One object of my invention is to provide an optical system for a projection printer which is operable to locate the soundtrack upon the 16 mm. film independently of the location of the soundtrack on 35 mm. film.

Another object of my invention is to provide an optical system mounting which permits moving or adjusting the image transversely of the film upon which it is being printed.

Another object of my invention is to provide an optical system which reduces the image unequally in two different directions, reducing the image laterally in the ratio of the widths of the soundtrack and reducing it longitudinally in the ratio of the relative speeds of the 35 mm. and 16 mm. films.

Another object of my invention is to provide means for accurately and expeditiously adjusting the position of the optical system transversely of the 16 mm. film.

Another object of my invention is to provide means for fixing the optical system in its adjusted position.

Figure 1:
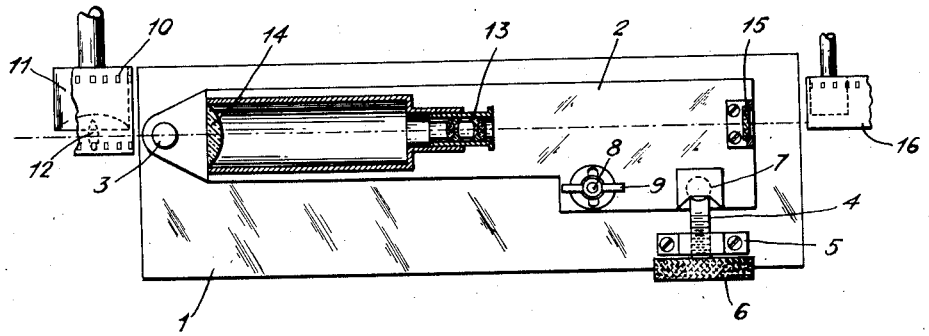
Fig. 1 is a plan view partly in section of my improved optical system showing it in proper relation to the several films.
Figure 2:
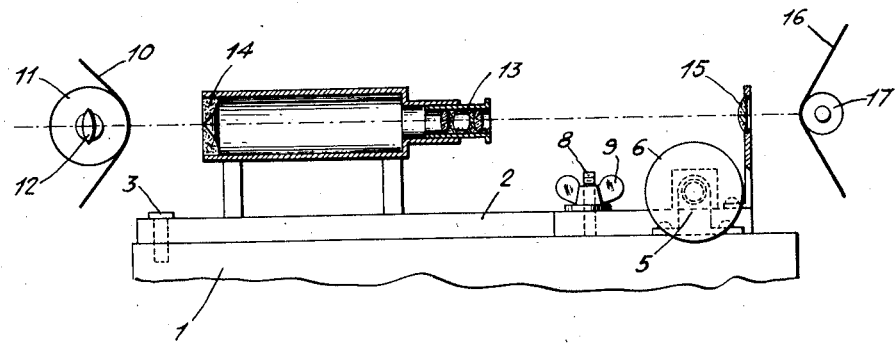
Fig. 2 is a side view of the optical system showing its relation to the several films and showing the optical barrel partly in section.

My apparatus is provided with a base member 1 which may be an individual base or may be a portion of the base member of the machine as a whole. Upon this base member is mounted a member 2 which is pivoted to the base 1 by the pin or screw 3. At the opposite end of the member 2 from the screw 3 it is provided with an adjusting screw 4 which is carried by the fixed nut 5 attached to the base 1 and is provided with a knurled head 6. The screw 4 is fastened to the member 2 by the ball and socket connection 7. It will be apparent that rotation of the knob 6 will move the connection 7 and the end of the member 2 transversely of the base 1.

The member 2 may be clamped rigidly to the base 1 by the screw 8 and wing nut 9.

35 mm. film 10 is fed over the drum 11 which is driven in any appropriate manner. Light is condensed upon the soundtrack of the film 10 by the condenser lens 12, the light being provided by any appropriate source. The objective lens 13 produces an image of the soundtrack of the film 10 at the positive film stock 16 carried upon the drum 17. The lens 14, which is a cylindrical lens having its axis parallel to the soundtrack, provides the desired amount of lateral reduction of the image; while the lens 15, which is of relatively short focus and has its axis transverse of the soundtrack, reduces the image longitudinally of the track. The transverse reduction of the soundtrack by the lens 14 is in the same proportion as the relative widths of the soundtrack while the longitudinal reduction by the lens 15 is in the same ratio as the relative speeds of the two films.

It will be apparent that rotation of the screw 6 will shift the entire optical system laterally about the pivot 3 and will move the image upon the film 16 a corresponding amount.

If desired the screwhead 6 may be calibrated and an appropriate scale may be provided for indicating the number of turns thereof.

Having now described my invention, I claim:

1. A projection printer comprising means for continuously moving a negative film, means for continuously moving positive film stock, means for projecting an image of the sound track area of said negative film upon said positive film stock, a mounting for said projecting means pivoted adjacent the said negative film and an adjusting screw in cooperative relation with the other end of said base member for adjusting the position of said image laterally of said positive film stock.

2. A projection printer comprising means for continuously moving a negative film, means for continuously moving positive film stock, means for projecting an image of the sound track area of said negative film upon said positive film stock, a mounting for said projecting means pivoted adjacent the said negative film, an adjusting screw in cooperative relation with the other end of said base member for adjusting the position of said image laterally of said positive film stock, and means for clamping said base member in adjusting position.

RAYMOND F. BRADY.